(12) United States Patent
Haber et al.

(10) Patent No.: US 7,095,232 B2
(45) Date of Patent: Aug. 22, 2006

(54) DETERMINATION OF BOREHOLE GEOMETRY INSIDE CASED WELLS WITH CROSSWELL ELECTROMAGNETICS

(75) Inventors: Eldad Haber, Freemont, CA (US); Ping Zhang, Albany, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/098,073

(22) Filed: Apr. 4, 2005

(65) Prior Publication Data

US 2005/0168225 A1  Aug. 4, 2005

Related U.S. Application Data

(62) Division of application No. 10/250,030, filed on May 29, 2003.

(51) Int. Cl.
*G01V 3/08* (2006.01)
*G01V 3/26* (2006.01)

(52) U.S. Cl. .................. 324/368; 324/339; 324/372

(58) Field of Classification Search ............. 324/326, 324/338–346, 355, 368, 372, 207.17; 175/40, 175/45, 50; 166/66.5
See application file for complete search history.

(56) References Cited

U.S. PATENT DOCUMENTS

| | | | | |
|---|---|---|---|---|
| 4,875,015 A | * | 10/1989 | Ward | 324/323 |
| 5,923,170 A | * | 7/1999 | Kuckes | 324/326 |
| RE36,569 E | * | 2/2000 | Kuckes | 324/346 |
| 6,151,961 A | | 11/2000 | Huber et al. | |
| 6,294,917 B1 | | 9/2001 | Nichols | |
| 6,393,363 B1 | | 5/2002 | Wilt et al. | |
| 6,703,838 B1 | * | 3/2004 | Conti | 324/339 |
| 6,791,331 B1 | * | 9/2004 | Conti | 324/339 |
| 2002/0017905 A1 | | 2/2002 | Conti | |
| 2003/0090424 A1 | * | 5/2003 | Brune et al. | 343/741 |

OTHER PUBLICATIONS

Uchida et al., "Effect of a Steel Casing on Crosshole EM Measurement," SEG Annual Meeting, pp. 442-445 (Texas 1991).
Augustin et al., "A Theoretical Study of Surface-to-Borehole Electromagnetic Logging in Cased Holes," Geophysics 54:1, pp. 90-99 (Jan. 1989).
Wu and Tabashy, "Influence of Steel Casings on Elecromagnetic Signals," Geophysics 59:3, pp. 378-390 (Mar. 1994).

* cited by examiner

*Primary Examiner*—Jay Patidar
(74) *Attorney, Agent, or Firm*—Kevin P. McEnaney; Bryan L. White; Victor H. Segura (57) ABSTRACT

A method is disclosed for locating a receiver in a borehole having a conductive liner by inducing an electromagnetic field from a transmitter in a first borehole, detecting at a first location by at least one receiver located in a second borehole having a conductive liner, a first electromagnetic field induced by the transmitter, detecting at a second location by the at least one receiver, a second electromagnetic field induced by the transmitter and calculating a set of geometry coordinates for the first location based on the first electromagnetic field and the second electromagnetic field.

5 Claims, 5 Drawing Sheets

DETERMINATION OF BOREHOLE GEOMETRY INSIDE CASED WELLS WITH CROSSWELL ELECTROMAGNETICS

CROSS REFERENCE TO RELATED APPLICATIONS

This application is a division of Ser. No. 10/250,030 filed May 29, 2003.

BACKGROUND

In performing operations within a cased well, such as logging formation properties, it is important to know the exact location of the tool lowered into the well to perform the specific function. Measuring the depth of well logging tools is traditionally made from the surface, by measuring how much of the cable which supports the tools has been deployed. Both wireline tools and while-drilling tools rely on the same basic concept.

The depth of the tool string is commonly determined by passing the cable over a calibrated measurement wheel at the surface of the well. As the tool is deployed, the length of cable unspoiled into the well is monitored as an estimate of tool depth. Depth compensation for cable stretch may be attempted by calculating a theoretical stretch ration based upon cable length, elasticity and tool weight. Even with very elaborate compensation algorithms, however, the actual amount of cable stretching may vary over time and because of unforeseen and unmeasured interactions between the cable and tool string and the well bore (such as tool hang-ups and cable friction) and anomalies such as cable "bounce". Deviated wells, in which the tool is pulled along the interior surface of the well casing, can present particular problems with variable and inconsistent cable loading, as the stool "sticks" and jumps along the well bore. Such problems are also encountered albeit to a lesser degree, in tubing-conveyed operations in which tubing length is measured by a wheel arranged to roll along the tubing as it is unspoiled. Even very small deployment length measurement error percentages and other discrepancies can result, with either type of deployment, in absolute tool positioning errors of several feet or more in a well of over a mile in depth, for example.

Another approach has been developed that measures the rotations of a set of calibrated wheels contacting the cable under a set force which generates enough friction to transmit any linear velocity of the cable to the perimeter of the wheels, allowing a direct measurement of the corresponding depth increment.

Yet another approach utilizes a pair of sensors located on or within the drill string along with a known reference point within the borehole. Given the distance between the two sensors is determined by the a relatively short piece of drill string, its stretch/compression effects are negligible compared to the stretch and compression observed on the total length of drill sting, and can be used as a downhole depth gauge by observing that when the second sensor will reach a correlable event already seen by the first sensor, the depth increment is the distance between the sensors.

Use of downhole sensors is challenging and present even more difficulties in the case of completed wells, in which the casing effects the ability to run certain downhole sensors. For example, steel casing has historically been thought of as a barrier to electromagnetic measurements of the properties of the formation. The problems presented by conductive liners are described by Augustin et al., in "A Theoretical Study of Surface-to-Borehole Electromagnetic Logging in Cased Holes," Geophysics, Vol. 54, No. 1 (1989); Uchida et al., in "Effect of a Steel Casing on Crosshole EM Measurements," SEG Annual Meeting, Texas (1991); and Wu et al., in "Influence of Steel Casing on Electromagnetic Signals," Geophysics, Vol. 59, No. 3 (1994). These prior art references show that coupling between a transmitter and a conductive liner is independent of the surrounding geological formation conductivity for a wide range of practical formation resistivities encountered in the field and that the magnetic field produced inside the conductive liner at a distance of a few meters or less from the transmitter depends only on the conductive liner properties and not on the formation properties.

Figure 1:
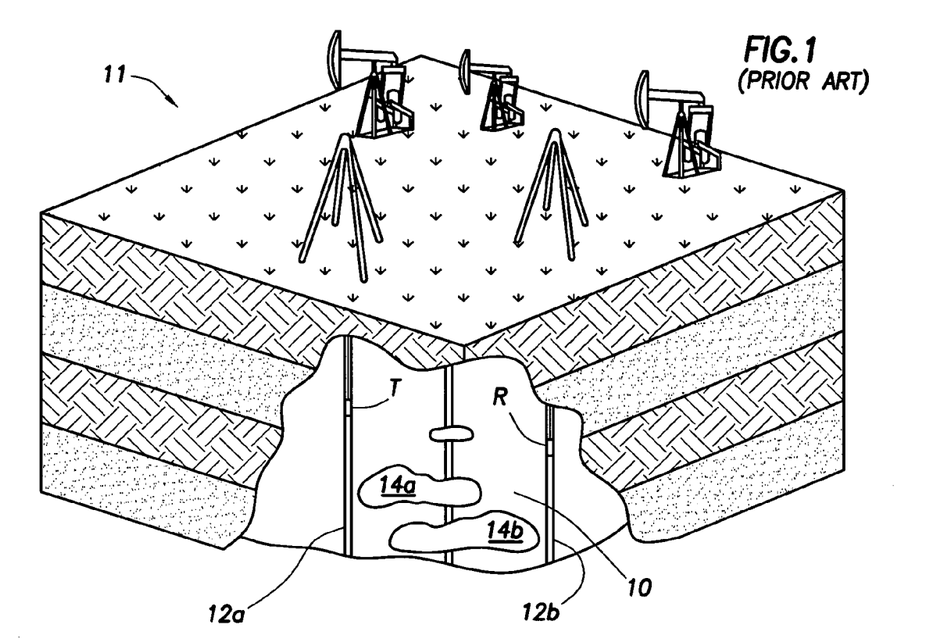
FIG. 1 is a perspective view of a geologic formation undergoing crosswell electromagnetic analysis.

FIG. 1 shows typical equipment used in the measurement of geological formation 10 resistivity between two drill holes 12a and 12b using electromagnetic induction. A transmitter T is located in one borehole, while a receiver R is placed in another borehole. The transmitter T typically consists of a coil (not shown) having a multi-turn loop (which consists of $N_T$ turns of wire) wrapped around a magnetically permeable core (mu-metal, ferrite or other ferro-magnetic material) with a cross section, $A_T$. The transmitter T may further comprise a capacitor (not shown) for tuning the frequency of the coil. When an alternating current, $I_T$, at a frequency of $f_0$ Hz passes through this multi-turn loop, a time varying magnetic moment, MT, is produced in the transmitter. This magnetic moment is defined as follows:

$$M_T = N_T I_T A_T \quad (1)$$

The magnetic moment $M_T$ can be detected by the receiver R as a magnetic field, $B_0$. The transmitter T, receiver R, or both are typically disposed in boreholes (e.g., 12a and 12b) in the earth formation 10. In this case, the detected magnetic field, $B_0$, is proportional to the magnetic moment of the transmitter, $M_T$, and to a geological factor, $k_1$, as follows:

$$B_0 = k_1 M_T \quad (2)$$

The geological factor, $k_1$, is a function of the spatial location and orientation of a field component of the magnetic field, $B_0$, with respect to the magnetic moment of the transmitter, $M_T$.

The receiver R typically includes one or more antennas (not shown). Each antenna includes a multi-turn loop of wire wound around a core of magnetically permeable metal or ferrite. The changing magnetic field sensed by the receiver R creates an induced voltage in the receiver coil (not shown). This induced voltage ($V_R$) is a function of the detected magnetic field ($B_R$), the frequency ($f_0$), the number of turns ($N_R$) of wire in the receiver coil, the effective cross-sectional area of the coil ($A_R$), and the effective permeability ($\rho_R$) of the coil. Thus, $V_R$ can be defined as follows:

$$V_R = \pi f_0 B_R N_R A_R \rho_R \quad (3)$$

While $f_0$ and $N_R$ are known, the product, $A_R \rho_R$, is difficult to calculate. In practice, these constants may be grouped together as $k_R$ and equation (3) may be simplified as:

$$V_R = k_R B_R \quad (4)$$

where $k_R = \pi f_0 N_R A_R \rho_R$. Thus, instead of determining the product $A_R \rho_R$, it is more convenient to determine $k_R$ according to the following procedures. First, the receiver coil is calibrated in a known field, at a known frequency.

Then, the exact value for $k_R$ is derived from the magnetic field ($B_R$) and the measured voltage ($V_R$) according to the following equation:

$$k_R = B_R/V_R \quad (5)$$

When this system is placed in a conducting geological formation, the time-varying magnetic field, $B_0$, which is produced by the transmitter magnetic moment, produces a voltage in the geological formation, which in turn drives a current therein, $L_1$. The current, $L_1$, is proportional to the conductivity of the geological formation and is generally concentric about the longitudinal axis of the borehole. The magnetic field proximate to the borehole results from a free space field, called the primary magnetic field, while the field resulting from current $L_1$ is called the secondary magnetic field.

The current, $L_1$, is typically out of phase with respect to the transmitter current, $I_T$. At very low frequencies, where the inductive reactance is small, the current, $L_1$, is proportional to dB/dt and is 90° out of phase with respect to $I_T$. As the frequency increases, the inductive reactance increases and the phase of the induced current, $L_1$, increases to be greater than 90°. The secondary magnetic field induced by current $L_1$ also has a phase shift relative to the induced current $L_1$ and so the total magnetic field as detected by receiver R is complex.

The complex magnetic field detected by receiver R may be separated into two components: a real component, $I_R$, which is in-phase with the transmitter current, $I_T$, and an imaginary (or quadrature) component, $I_I$, which is phase-shifted by 90°. The values of the real component, $I_R$, and the quadrature component, $I_I$, of the magnetic field at a given frequency and geometrical configuration uniquely specify the electrical resistivity of a homogeneous formation pierced by the drill holes. In an inhomogeneous geological formation, however, the complex field is measured at a succession of points along the longitudinal axis of the receiver borehole for each of a succession of transmitter locations. The multiplicity of measurements thus obtained can then be used to determine the inhomogeneous resistivity between the holes.

In both cases, i.e., measuring homogeneous geological formation resistivity or measuring inhomogeneous geological formation resistivity, the measurements are typically made before extraction of hydrocarbons takes place. This is because the boreholes typically are cased with conductive liners (e.g., metallic casing; see 16a and 16b in FIG. 3) in order to preserve the physical integrity of the borehole during hydrocarbon extraction. The conductive tubular liners interfere with resistivity measurements and are difficult and costly to remove from the borehole once they are installed. As a result, prior art systems such as that shown in FIG. 1 are not suitable for analyzing hydrocarbon reservoirs once extraction of the hydrocarbons begins.

The net or effective moment, $M_{eff}$, of a transmitter inside a conductive liner is dictated by the inductive coupling between the transmitter and the conductive liner. Physically, the resistivity of the conductive liner is very low and the inductance relatively high. This property results in a current of almost the same magnitude as that of the transmitter current being induced in the conductive liner. Lenz's Law predicts that the magnetic field generated by this induced current in the conductive liner will oppose the time-varying magnetic field produced by the transmitter current. Thus, the magnetic field generated by the transmitter is mostly cancelled out by the magnetic field generated by the conductive liner. As a result, the magnetic field external to the conductive liner is greatly reduced, and its magnitude is proportional to the difference in currents in the transmitter and the conductive liner. In effect, the conductive liner "shields" the transmitter from any receiver positioned outside of the conductive liner.

Figure 2:
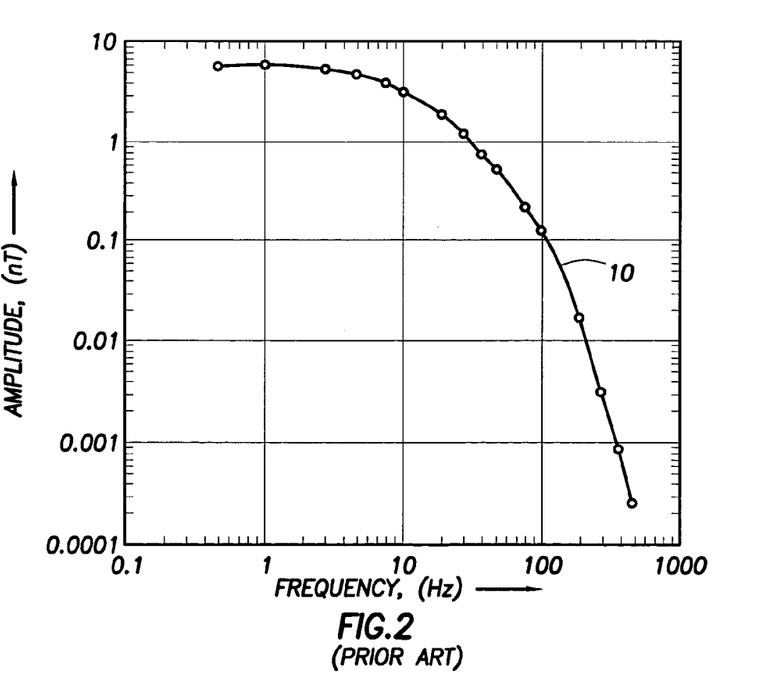
FIG. 2 is a graphical representation of a magnetic field sensed with a receiver disposed in a borehole that has been cased with a conductive liner.

An analogous situation is present with respect to a receiver if it is surrounded by a conductive liner. The field to be detected induces currents concentric with the receiver coil whose sense is such as to reduce the field within the liner. The field to be detected is consequently highly attenuated and the measurement is highly influenced by the variations in attenuation caused by the variation in liner properties, and example of which is graphically demonstrated by the slope of curve 10 shown in FIG. 2. The situation is exacerbated if both the transmitter and the receiver are surrounded by conductive liners. Often the design criteria for a crosshole survey of a cased borehole reduces the signal to a level that is undetectable by standard receivers. Moreover, the variance in conductivity, permeability, and thickness along a longitudinal axis of a liner makes difficult determining the attenuation factor at any given point.

The attenuation due to a steel casing surrounding the transmitter for a homogeneous formation is essentially constant a few meters form the source. Since the attenuation is constant the ratio of the fields as described, and incorporated herein, in U.S. Pat. No. 6,294,917 B1, to Nichols, removes the effects of the casing. This constancy of the fields can also be removed by calculating a shift operator as described, and incorporated herein, in U.S. Pat. No. 6,393,363 B1 to Wilt and Nichols. However, for multiple cased boreholes, both the ratio and shift operator methods preferably utilize an extra monitor for the transmitted field.

SUMMARY OF INVENTION

A method is disclosed for locating a receiver in a borehole having a conductive liner by inducing an electromagnetic field from a transmitter in a first borehole, detecting at a first location by at least one receiver located in a second borehole having a conductive liner, a first electromagnetic field induced by the transmitter, detecting at a second location by the at least one receiver, a second electromagnetic field induced by the transmitter and calculating a set of geometry coordinates for the first location based on the first electromagnetic field and the second electromagnetic field.

A further method is disclosed for mapping a trajectory of a cased wellbore traversing an earth formation by inducing a first magnetic field at a first position in a wellbore, detecting a first response to the induced first magnetic field at a second position in the wellbore, detecting a second response to the induced first magnetic field at a third position in the wellbore, repeating the inducing and detecting steps over a range of wellbore depths and calculating a set of geometry coordinates defining a trajectory of the wellbore based on the detected responses.

DETAILED DESCRIPTION

According to an embodiment of the disclosed subject matter, a regularized inversion formulation removes the casing effects from field data to yield a data set equivalent to one that would be obtained in uncased well. The solution obtained is dependent on the geometry of the survey and the conductivity of the formation being measured.

Referring to FIG. 1, a geologic formation 11 under analysis includes one or more boreholes, shown generally as 12a and 12b and a reservoir of resources of interests, in this example one or more reservoirs of hydrocarbons, shown generally as 14a and 14b. Typically, at least one of the boreholes 12a and 12b is cased with a conductive liner 16a and 16b, shown more clearly in FIG. 3. A system 19 employed to analyze the geologic formation includes a transmitter 20 disposed within borehole 12a, a first region of the geologic formation. In signal communication with the transmitter 20 is a signal generator included in surface station 22. A receiver 24 is disposed in the borehole 12b. The transmitter 20 and receiver 24 are deployed using standard seven conductor wireline winches, cables and standard seven-pin Gerhardt-Owens cable connectors, shown generally as 26. The system 19 is operated using a computer (not shown), included in surface station 28 that is in data communication with the transmitter 20 and receiver 24. The computer (not shown) includes a processor (not shown) and memory (not shown) that stores programs necessary to operate the system 19. It should be noted that although boreholes 12a and 12b are shown as substantially straight vertical wells for clarity, it is very common for the boreholes to varying trajectory about a z-axis or depth axis.

Typically, magnetic fields are generated by the transmitter 20 at various vertical levels above, within, and below an area of interest. The magnetic fields sensed by the receiver 24 are sensed at various vertical levels, $r_1$, $r_2$, and $r_3$, for example, above, within, and below the area of interest. In an exemplary embodiment, the transmitter 20 is placed in an uncased borehole and traversed between fixed depth positions, $s_1$, $s_2$, and $s_3$, for example, at a rate of 3 to 5 meters/minute. The receiver remains at a fixed position, $r_1$, for example, in a cased borehole. After the transmitter 20 moves between the aforementioned fixed depth points, the receiver is moved to a different position, $r_2$ for example, within the lined borehole and again the transmitter 20 traverses between the fixed depth positions. However, for the reasons discussed above, the liner has an adverse affect on the measurements made.

To overcome the effects of the liner, a model of the formation, more fully disclosed in U.S. Pat. No. 6,393,363 to Wilt et al., is used to calculate the magnetic field sensed by the receiver 24 which corresponds to information that would be contained in the same without the presence of the electrically conductive liner. From this modeled representation, a first approximation of the casing information contained in the magnetic field sensed by the receiver 24 may be identified and removed. The corrected data is then used to determine a new model for the formation resistivity and the process is repeated several times. Each time the casing information is more accurately removed and the formation response more accurately recovered.

Another approach, more fully disclosed in U.S. Pat. No. 6,294,917 to Nichols can be used to compensate for the effects of a conductive liner by measuring the characteristics of the geologic formation as a function of a ratio of two magnetic fields sensed by one or more receivers disposed in a borehole. Specifically, at least two measurements are made at separated positions outside the casing from the same transmitter inside the casing. In that case, the ratio of the two measurements depends only on the formation since the casing contribution terms cancel in the ratio. This same principle works to correct for casing effects when the transmitter and receiver(s) are within separate cased wells or within a single cased well. The end result is a measurement of formation properties outside a cased well that is equal or closely approximates a fictional measurement of the same formation taken where the casing is not present.

Yet another approach, more fully disclosed in U.S. patent application Ser. No. 09/879,252 to Conti, to reduce or minimize the effect of casing on formation measurements uses a multiple receiver approach in which a first receiver is specifically tuned to depend nearly exclusively on the magnetic field induced in the borehole casing. A second receiver detects the whole magnetic field including that induced in the formation and the borehole casing. The measurement of the first receiver is used to correct the measurement of the second and other receivers.

For a generalized approach, it is assumed that the connection between the casing data and the true data is represented by $$H_c = C_1 H C_2 \tag{6}$$

where $$H_c = H_c(s_i, r_j) i=1,2 \ldots n_s; j=1,2 \ldots n_r \tag{7}$$

is a matrix of the magnetic fields in casing as a function of the source s and the receiver r, $$H = H(s_i, r_j) i=1,2 \ldots n_s; j=1,2 \ldots n_r \tag{8}$$

is the magnetic field in an uncased well, $$C_1 = diag\{c_1^{(1)}, c_2^{(1)} \ldots c_{ns}^{(1)}\} \tag{9}$$

is the casing coefficients around the source and $$C_2 = diag\{c_1^{(2)}, c_2^{(2)} \ldots c_{nr}^{(2)}\} \tag{10}$$

is the casing coefficient around the receiver.

A continuous process along the borehole is assumed and that $H_c$ and $H$ are complex functions of s and r. With both C1 and C2 a continuous function of the casing, equation (6) can be rewritten as $$H_c(s,r) = C_1(s) H(s,r) C_2(r) \tag{11}$$

In order to remove the casing coefficients, the log of both sides is taken to obtain $$\log(H_c(s,r)) = \log(C_1(s)) + \log(H(s,r)) + \log(C_2(r)) \tag{12}$$

The casing terms can be eliminated by taking derivatives with respect to r and s to obtain $$(d^2 \log(H_c(s,r)))/drds = (d^2 \log(H(s,r)))/drds \tag{13}$$

Figure 3:
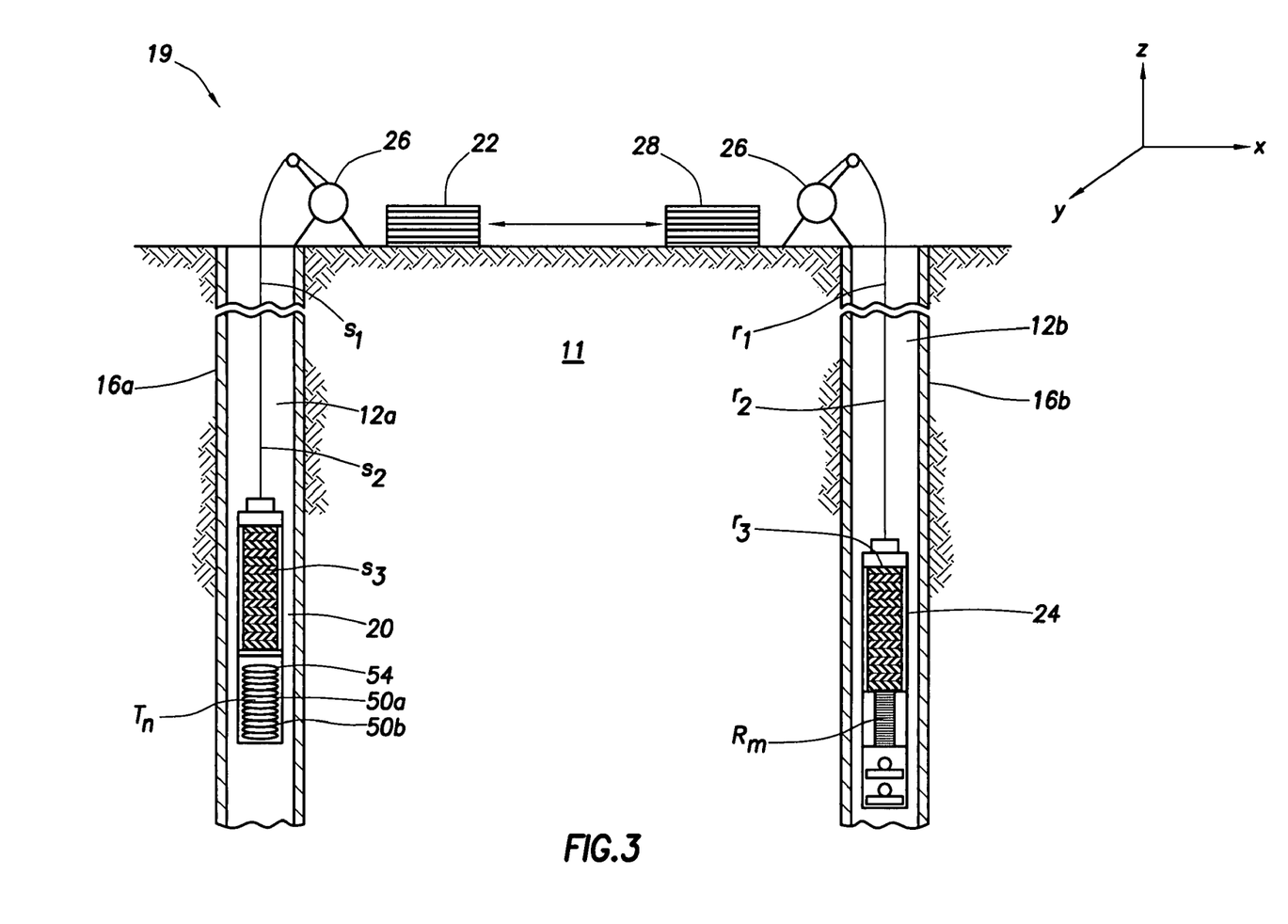
FIG. 3 is a view of an exemplary cross-well electromagnetic system according to the disclosed subject matter.

Equation (13) represents a ratio in the H domain but it is a simple derivative in the log domain. Returning to FIG. 3, where two source/transmitter positions ($s_1$ and $s_2$) and two receiver positions ($r_1$ and $r_2$) are utilized, then the digitized form of equation (13) can written as $$\delta H = \frac{1}{s_2 - s_1} \left( \frac{v_{s2r2} - v_{s1r2}}{r_2 - r_1} - \frac{v_{s2r1} - v_{s1r1}}{r_2 - r_1} \right) \quad (14)$$

where $v=\log(H_c)$. $\delta H$ defines a new data set which does not depend on the casing and therefore can be used to recover the geometry of the receiver well. Note that in order to get equation (14), two different source and receiver positions along the borehole are necessary. The distance D between the two measurement positions, $s_2-s_1$ or $r_2-r_1$, for example, is preferably 5% of the separation between the transmitter and receiver wells. Knowing $H_c$ (surveyed field) and D, the new data set $\delta H$ is defined. In general, $\delta H$ depends on the survey geometry and formation conductivity $$\delta H = \delta H(x_r, y_r, z_r, \sigma) \quad (16)$$

So from the data set $\delta H$, both geometry and conductivity can be determined. However trying to define both geometry and conductivity from the equation (15) can be unstable mathematically. Instead, we can make a reasonable assumption to the conductivity by using induction logging data. More important, at low frequencies the effect of the conductivity on the data is much smaller than the one from the geometry. So with assumed conductivity, we can write following object function $$\phi = \|\delta H^{obs} - \delta H(x_r, y_r, z_r, \sigma_{known})\| \quad (16)$$

where $\delta H^{obs}$ is field data and $\delta H(x_r, y_r, z_r)$ is model response which can be calculated from assumed formation conductivity and geometry parameters. Using a known least squares mathematical approach to solve equation (16), we are able to obtain receiver locations which minimize the object function $\phi$. Since the object function of equation (16) depends on (x, y, z), the inversion will output an optimal (x, y, z) which minimizes equation (16). Each r and s value of equation (14) are, in turn, defined by a (x, y, z) coordinate. Treating the transmitter location, or s location, as the reference point, the solution from equation (16) defines the receiver or r locations.

Note that if no prior information is known about the formation conductivity, equation (16) can still be solved for both geometry and formation conductivity using single frequency data. As mentioned above, if low frequency data is collected, equation (16) is insensitive to the formation conductivity and the geometry can be derived in the described straight forward manner. With high frequency data, on other hand, the geometry and conductivity are coupled and it is difficult to separate two effects.

To address the high frequency applications, one embodiment is to collect dual frequencies data, one high frequency (a few hundred Hz) and one low frequency (tens Hz). As mentioned before, low frequency data depends more on geometry, less on formation conductivity, that means we can assume a proper value to the formation conductivity based on other geological/geophysical information. Even if this assumed conductivity is not accurate, we still can solve the geometry accurately with low frequency data. Once the geometry is fixed, estimating formation conductivity from equation (16) becomes a simple inversion problem using the high frequency data.

Figure 4:
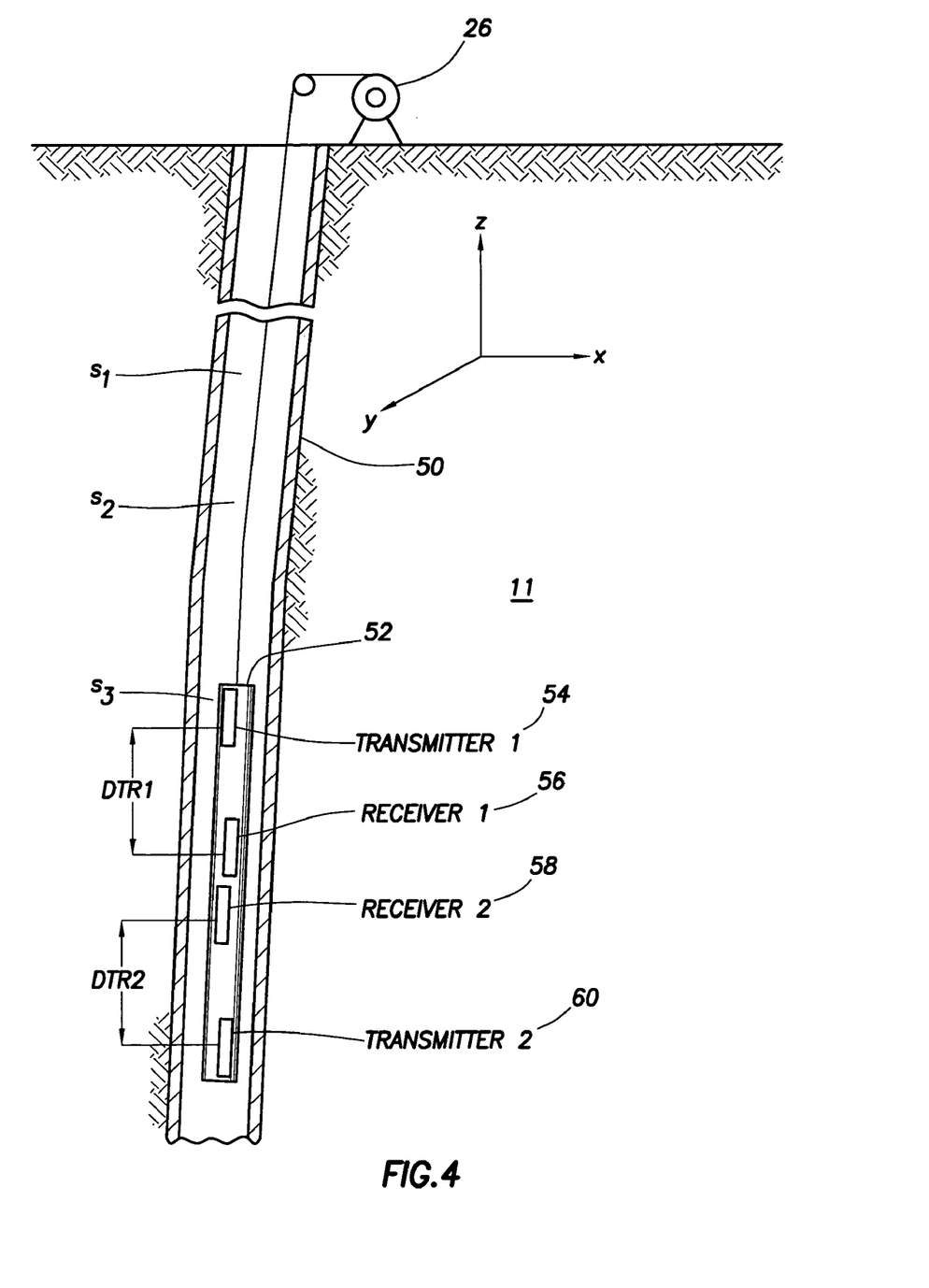
FIG. 4 is a view of an exemplary single well electromagnetic system according to the disclosed subject matter.

Note that equation (16) can also be used for single well configuration. That is borehole geometry is surveyed in a single cased hole using multiple receivers and transmitters. In the case of a single well application, a typical configuration includes multiple receivers and transmitters in a single downhole tool. Reference is made to FIG. 4, where transmitters 54 and 60 and receivers 56 and 58 are included as part of the same tool 52. In the single well configuration, a stationary receiver is not available. Instead, measurements are made along the borehole, for example at $s_1$ and $s_2$. Casing correction may be performed according to one or more of the above mentioned techniques, such as the ratio method. The same considerations, such as the distance between measurement locations, discussed above with reference to the cross-well application apply equally to the single-well application. For example, although the tool operation and configuration can vary, acceptable results have been obtained using a transmitter—receiver separation between 2 meters and 50 meters, and an operating frequency of a few kilo hertz. Further, although in practice the receiver is most typically located below the transmitter, the transmitter and receiver locations can vary so long as the distance between is known or can be reasonable approximated. Here again, knowing the coordinates of a reference point (say at the top of the well), absolute coordinates can then be defined along the well.

Figure 5:
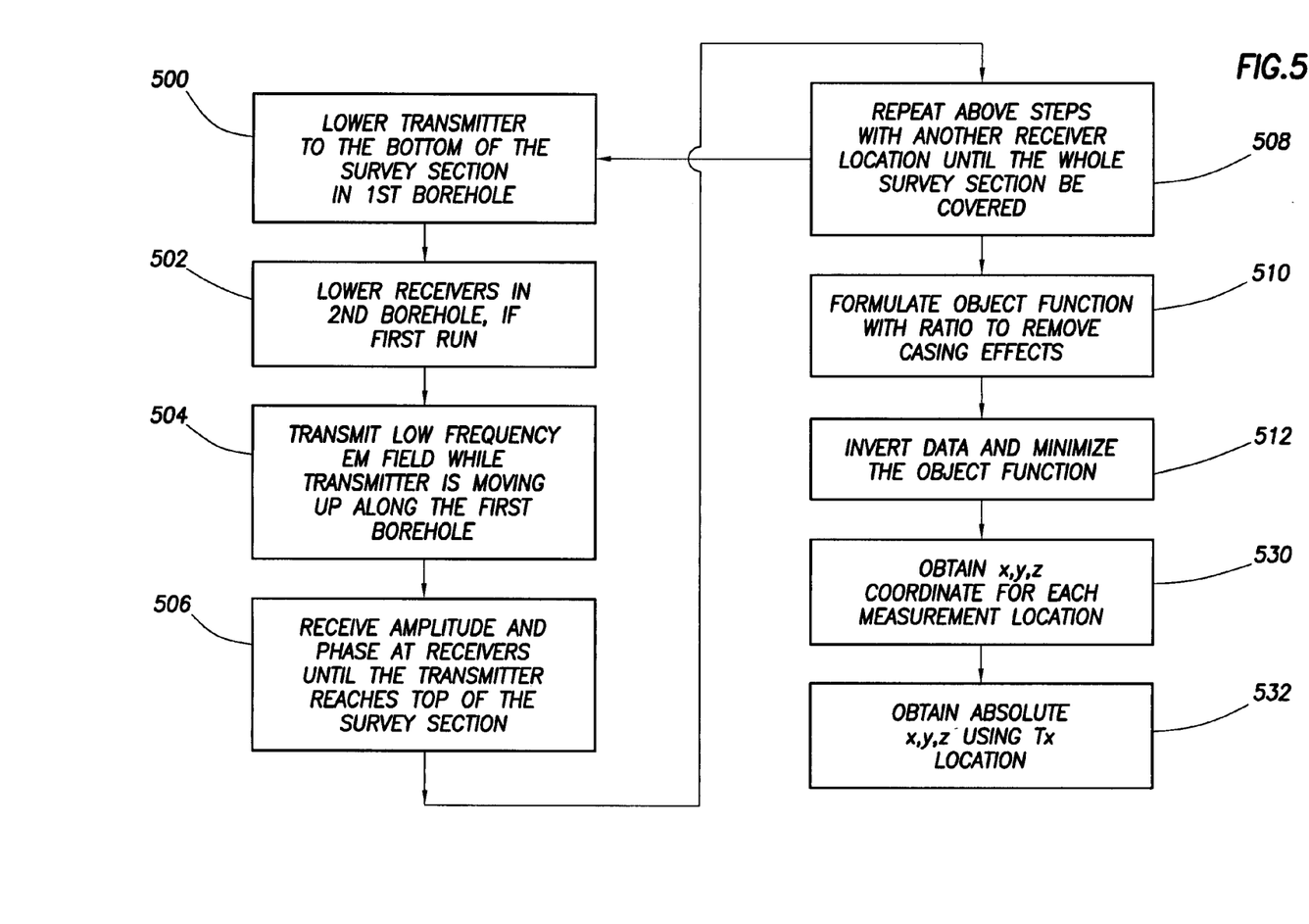
FIG. 5 is a flow diagram of a disclosed method to determine the trajectory of a cased wellbore using the system of FIG. 3.

Turning now to FIG. 5, shown is a flow diagram of an exemplary process for obtaining the geometry of a cased borehole. First at step 500, at least one transmitter is lowered into a first borehole. According to one embodiment, the transmitter is lowered to lowest point of the desired survey depth. At step 502, at least one receiver is lowered into the second borehole. In single well configuration, one transmitter and two receivers are lowered into the same well. As mentioned above, the transmitter/receiver configuration may be varied according to the casing correction method employed. For example, the ratio casing correction method may be performed where two or more measurements are taken under similar transmitter conditions. According to one embodiment, up to four receivers are used in the second borehole, while a single transmitter is used in the first borehole. According to another embodiment, multiple transmitters in the first borehole may be used to simultaneously transmit to multiple receivers in the second borehole.

Continuing at step 504, a low frequency EM field is transmitted while the tool is moved up the borehole from the bottom survey point. The transmission can be run continuously as the tool moves upward or performed at discrete intervals timed to be received by the receiver or receivers. Low frequency EM fields are utilized to minimize the effect the formation properties have on the received measurements. In this way, the low frequency EM fields allow the relative geometry of the multiple boreholes to govern the data much more than the formation properties, such as formation conductivity. Further, if the formation properties are known, such as a reasonable approximation of conductivity, this data can be used to improve the accuracy of the data acquired by the receiver tool.

The receivers, at step 506, take simultaneous measurements at discrete times as the transmitter moves up the borehole. Because the measurements are made simultaneously, it is assured that the same transmitter conditions are present for the different measurements taken at each receiver. The data received by the receivers include both the amplitude and phase of the EM response to the transmitted field. During these initial steps, the receiver positions remains the same while the transmitter position moves upward. After the transmitter has run the length of the survey, the process is repeated with the receivers at a new location in the second borehole, and the transmitter again moved over the length of the survey depth. The process loops between steps 500 and 508 until the receiver locations span the desired survey depth of the second borehole. Alternatively, the process loops until enough data has been obtained to calculate the geometry of the second borehole (the borehole with the receivers) within a predefined accuracy limit. Specifically, measurements need not be taken at every point within the second borehole to obtain a borehole geometry. Instead, a discrete number of data points may be used to extrapolate the full length of the survey. Thus, the number of receiver locations, or transmitter runs, that is needed is dependent on the accuracy desired for the map of the well.

Once the data has been obtained, a casing correction method is applied at step 510 to remove the casing effect. As mentioned, this can be done according to any number of known techniques, including using a ratio of measurements, employing additional receivers tuned to measure only the casing EM field response and software modeling techniques. After casing correction, conceptually, the data now resembles data that would be expected if the process was run in non-cased wells. Thus, at this point, the received magnetic field can be mathematically represented as a function of the formation and the geometry of the survey, $$H_{corrected} = f(\sigma, x, y, z) \quad (14)$$

where $\sigma$ is the conductivity of the formation and $(x, y, z)$ is the location of the receiver making the EM field measurement relative to the transmitter location. As mentioned, with low frequency EM fields, very small secondary induction fields will be generated by the formation properties. Therefore the effect on the measured fields can be essentially ignored. On the other hand, the measured fields strongly depends on the separation between transmitter and receiver. In fact the EM fields from transmitter will be proportional to $$\frac{1}{r^3},$$

where r is the separation between transmitter and receiver. Clearly the geometry effects govern the EM field measurements.

The left side of equation (14) is obtained through the casing correction processing mentioned above. From the casing corrected data, based on equation (14), the data mostly depends upon the geometry of the survey for low frequency EM field measurements. From this, we are able to construct an object function which consists of casing corrected observed data and a modeled response. The model response is derived from Maxwell equations which allow the EM fields be calculated from the formation conductivity and survey geometry. Since the conductivity can be assumed, we only need to vary geometry (x, y, z) to make model response match with the observed data. This is the inversion process at step 512. A known least squares procedure is used in the inversion process to obtain the receiver location for each set of transmitter positions. From the inversion, the x, y and z coordinates are output at step 530. The (x, y, z) data represents the location of the receiver at each measurement relative to the transmitter at the same measurement. That means during the process, the transmitter location is used as reference location. Every (x, y, z) on receiver well is defined relative to a corresponding $(x_0, y_0, z_0)$ on the transmitter well. If a reasonable estimate of the transmitter location is known (by gyro or location method, such as wireline depth), this can be used at step 532 to obtain an absolute location of the receiver measurement locations.

Figure 6A:
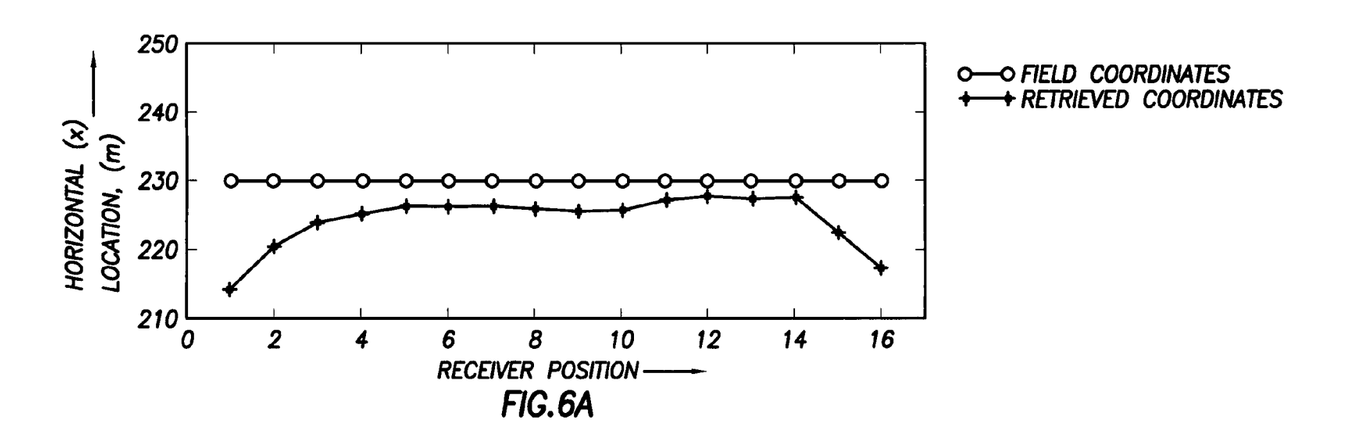
FIG. 6 is an exemplary output of the disclosed trajectory mapping.
Figure 6B:
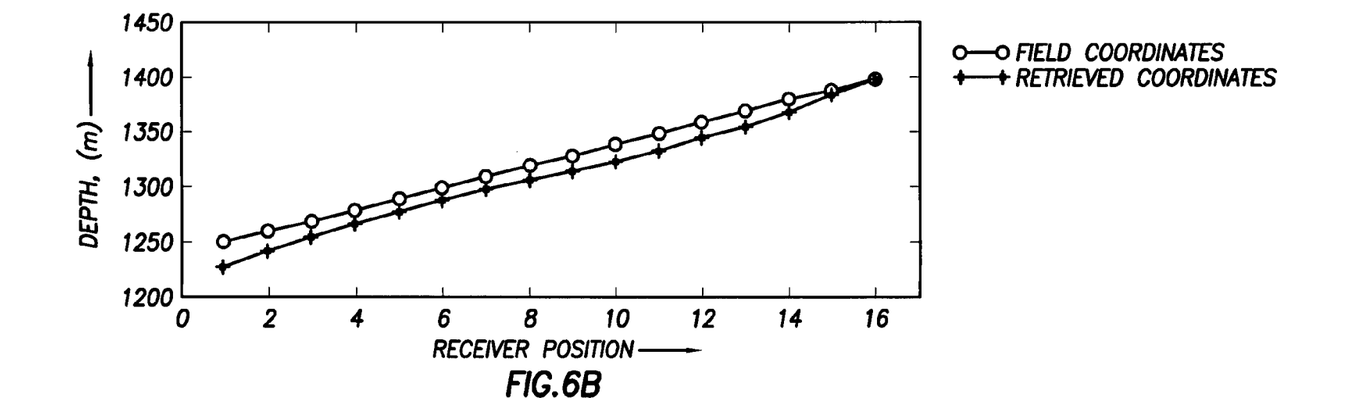

Turning now to FIG. 6, shown is an exemplary output of the x and z coordinates of the borehole geometry mapping. The x coordinates represent the horizontal position of the receiver along an axis parallel to the transmitter borehole. The z coordinates represent the vertical position, or depth, of the receiver within the borehole. As discussed above, absolute borehole geometry can be obtained based on the known or best reasonable assumption for the location of the transmitter, or alternatively the borehole geometry of the well in which the transmitter is disposed. Furthermore, although the y-coordinate is not shown, a y-coordinate represents the horizontal position of the receiver along an axis orthogonal to the transmitter borehole.

The retrieved coordinates are shown adjacent the field coordinates, which are assumed based on the best available information. As can be seen, the retrieved coordinates obtained using the disclosed methods provides improved resolution. For example, the field coordinates for data along the x axis is assumed to be constant. This means the borehole under survey is initially assumed to be parallel to the transmitter borehole. However, the retrieved x-coordinates show that the survey borehole closer to the transmitter borehole at the first few and last few receiver locations than at the middle receiver locations. Further, the retrieved z-coordinates, or depth, show the receiver to be a slightly more shallow depths at each receiver location than expected. Such accurate depth data can be very important for certain downhole operations, such as perforating or precise formation evaluation measurements.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for mapping a trajectory of a cased wellbore traversing an earth formation, the method comprising:
   inducing a first magnetic field at a first position in a wellbore;
   detecting a first response to the induced first magnetic field at a second position in the wellbore;
   detecting a second response to the induced first magnetic field at a third position in the wellbore;
   repeating the inducing and detecting steps over a range of wellbore depths;
   calculating a set of geometry coordinates defining a trajectory of the wellbore based on the detected responses.

2. The method of claim 1, wherein the magnetic field is a low frequency electromagnetic field.

3. The method of claim 1, wherein the inducing and detecting steps are repeated over a plurality of frequencies, wherein a second frequency magnetic field is less affected by a conductivity of the formation than a first frequency magnetic field.

4. The method of claim 3, the calculating step comprising the steps of:
   calculating the set of geometry coordinates based on a response from the second frequency magnetic field further based on an estimate of the conductivity of the formation; and calculating an updated conductivity of the formation from a response from the first frequency magnetic field based on the set of geometry coordinates.

5. The method of claim 1, wherein the wellbore comprises at least two adjacent wellbores, the first position located in a first wellbore and the second and third positions located in the second wellbore, the set of geometry coordinates defining a trajectory of the second wellbore.

* * * * *